E. F. DAVIS.
STEERING WHEEL MOUNTING.
APPLICATION FILED OCT. 27, 1919.
1,374,830.
Patented Apr. 12, 1921.
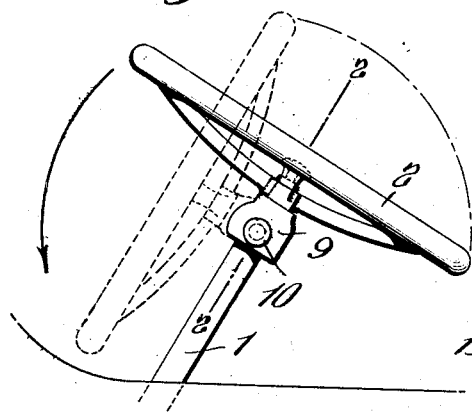
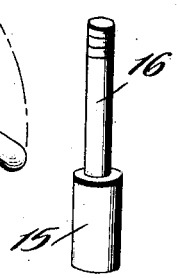
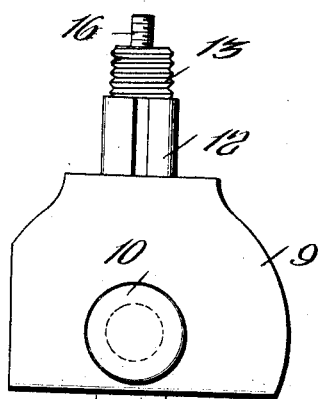
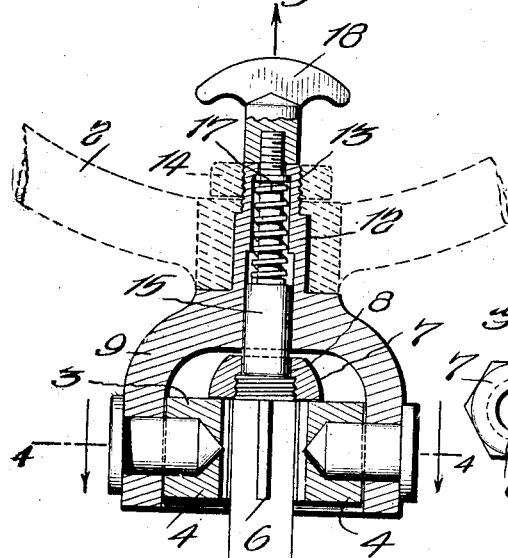
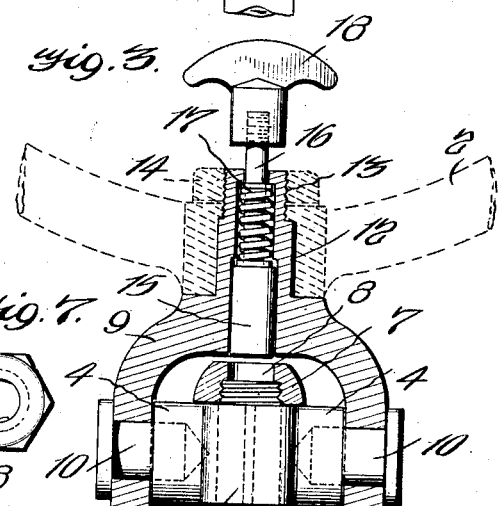
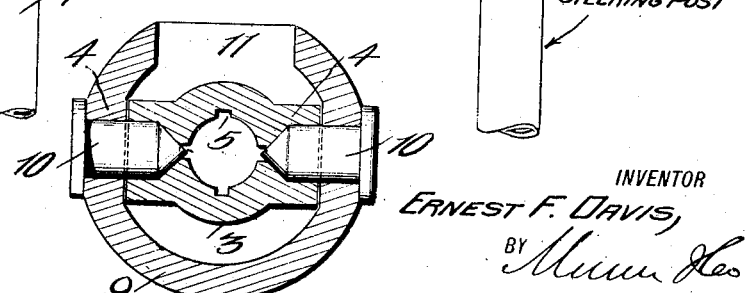
WITNESSES
INVENTOR
ERNEST F. DAVIS,
BY
ATTORNEYS

UNITED STATES PATENT OFFICE.

ERNEST FOSTER DAVIS, OF ELMIRA, NEW YORK, ASSIGNOR TO FRED J. LESH AND CLARENCE G. WOOD, BOTH OF MUNCIE, INDIANA.

STEERING-WHEEL MOUNTING.

1,374,830.  Specification of Letters Patent.  Patented Apr. 12, 1921.

Application filed October 27, 1919. Serial No. 335,046.

*To all whom it may concern:*

Be it known that I, ERNEST FOSTER DAVIS, a citizen of the United States, and a resident of Elmira, in the county of Chemung and State of New York, have invented an Improvement in Steering-Wheel Mountings, of which the following is a specification.

My invention is an improvement in steering wheel mountings, and has for its object to provide a mounting of the character specified, for permitting the wheel to be held firmly in a plane perpendicular to the steering column or to be tilted forwardly into a plane parallel with the said column, where it will be out of the way while entering or leaving the car.

In the drawings:—

Figure 1 is a side view of the improved mounting,

Fig. 2 is a section on the line 2—2 of Fig. 1, showing the parts in one position, Fig. 3 is a similar view showing the parts in another position.

Fig. 4 is a section on the line 4—4 of Fig. 2, looking in the direction of the arrows adjacent to the line, Fig. 5 is a side view with the wheel removed, Fig. 6 is a perspective view of the locking bolt or plunger, Fig. 7 is a top plan view of the nut.

The present embodiment of the invention is shown in connection with the steering column 1 and the steering wheel 2 of a motor vehicle, and the improvement comprises a sleeve or collar 3 which is fitted over the top of the column and keyed thereto, the said sleeve or collar having oppositely arranged radial bearing lugs 4. The sleeve or collar has longitudinally extending grooves 5, which are adapted to receive keys 6 on the steering column, and the said sleeve is held in place by a nut 7 which is threaded onto the top of the column. It will be noted from an inspection of Fig. 3 that the nut 7 is only threaded a part of its length, the remainder of the bore, as indicated at 8, being plain, for a purpose to be presently described.

A housing 9 is mounted about the sleeve 3, and is pivoted thereto by means of bearing pins 10, the said pins being passed through the opposite sides of the housing and into engagement with openings in the lugs 4, before mentioned. The inner ends of the bearing pins 10 are conical, as shown, and the openings in the lugs 4 are shaped to correspond. The housing 9 is thus mounted to tilt on the wheel in the manner indicated in Fig. 1, and it will be seen from an inspection of Fig. 4 that a part of the housing is cut away, as indicated at 11, to permit the wheel to swing into a plane parallel with the steering column. The housing has a reduced plain portion 12 for receiving the hub of the wheel 2, and a reduced threaded portion 13 for engagement by the nut 14, which holds the wheel in place. This portion of the housing is tubular, and a plunger or locking bolt 15 is mounted in the tubular portion.

This locking bolt has a stem 16, and a coil spring 17 encircles the stem between the plunger and the upper end of the bore of the tubular portion of the housing. This bore is reduced at its upper end to fit the stem closely, and the spring normally forces the plunger downwardly. The plunger is adapted to engage the plain portion 8 of the bore of the nut 7, to lock the wheel in a plane at right angles to the column, and the handle 18 is threaded onto the upper end of the stem for convenience in manipulating the plunger. It will be noted that the portion 12 of the housing has keys for engaging the key-ways of the wheel.

In operation, the wheel normally occupies the position of Fig. 1, where it is rigidly held in the proper position with respect to the column to permit the vehicle to be steered. In alighting from the vehicle, the wheel is turned into the dotted line position of Fig. 1, the plunger being moved into the position of Fig. 3, which leaves the wheel free to tilt. The housing 9 swings on the journal pins 10.

I claim:—

1. In combination with the steering column and the steering wheel, of a sleeve keyed to the column, a housing inclosing the the sleeve and pivoted thereto, said housing having a cylindrical extension at its top for receiving the wheel and a threaded portion beyond the extension for engagement by a nut to hold the wheel in place, a plunger movable in the plain portion and having a stem extending beyond the housing, a handle connected with the stem, a spring normally pressing the plunger toward the column, and a nut for holding the sleeve in place and having the outer end of its bore plain for engagement by the plunger.

2. In combination with the steering column and the steering wheel, of a sleeve secured to the column, a housing inclosing the sleeve and pivoted thereto and having an extension for receiving the wheel, means for securing the wheel in place, and a plunger movable in the housing, a spring normally pressing the plunger toward the column, and a nut for holding the sleeve in place and having the outer end of its bore plain for engagement by the plunger.

3. In combination with the steering column and the steering wheel, of a sleeve secured to the column, a housing inclosing the sleeve and pivoted thereto and having an extension for receiving the wheel, means for securing the wheel in place, and a plunger movable in the housing, a spring normally pressing the plunger toward the column, and means for holding the sleeve in place and having an opening for receiving the plunger.

ERNEST FOSTER DAVIS.